United States Patent
Ortlieb et al.

(10) Patent No.: US 8,478,843 B1
(45) Date of Patent: Jul. 2, 2013

(54) TEMPLATES WITH STATIC PARAMETER CACHING

(75) Inventors: Michael J. Ortlieb, Seattle, WA (US); Adam Carlson, Seattle, WA (US); Andrew C. Berg, Bothell, WA (US); Joseph C. Lee, Seattle, WA (US)

(73) Assignee: IMDB. COM, Inc., Seattle, WA (US)

(*) Notice: Subject to any disclaimer, the term of this patent is extended or adjusted under 35 U.S.C. 154(b) by 322 days.

(21) Appl. No.: 13/038,210

(22) Filed: Mar. 1, 2011

(51) Int. Cl.
*G06F 15/16* (2006.01)

(52) U.S. Cl.
USPC ........... 709/219; 709/203; 709/217; 709/225; 709/229; 709/232

(58) Field of Classification Search
USPC .................. 709/203, 217, 219, 225, 229, 232
See application file for complete search history.

(56) References Cited

U.S. PATENT DOCUMENTS

| | | | |
|---|---|---|---|
| 6,487,709 B1* | 11/2002 | Keller et al. | 716/117 |
| 7,174,326 B2* | 2/2007 | Ireland et al. | 707/E17.005 |
| 2003/0236836 A1* | 12/2003 | Borthwick | 709/204 |
| 2009/0094382 A1* | 4/2009 | Tsimelzon et al. | 709/246 |

* cited by examiner

*Primary Examiner* — Phuoc Nguyen
(74) *Attorney, Agent, or Firm* — Novak Druce Connelly Bove + Quigg LLP

(57) ABSTRACT

Techniques, including systems and methods, for providing content utilize templates. As part of providing content to clients, templates and arguments for the templates are provided to clients. The clients themselves receive the templates and arguments for the templates and instantiate the templates. Templates and arguments for templates may each be cached by clients and/or servers for efficient future use.

15 Claims, 7 Drawing Sheets

TEMPLATES WITH STATIC PARAMETER CACHING

BACKGROUND

User interface displays, such as displays of web pages, (or portions thereof) are often constructed from templates. Arguments may be provided to the templates via various carriers. In the context of templates for web pages, as an example, the carriers include uniform resource locator (URL) parameters, cookie values, and hyper-text transfer protocol (HTTP) POST variables. In some situations, it is desirable to provide a single standalone link as a reference to a fully constructed instance of a template, where the template and its arguments are already combined. Such a reference may require a way of providing parameters for generating the constructed instance of a template. One conventional way of providing parameters for template construction includes appending parameters to a URL. URLs, however, by their nature lack an ability to specify cookie or POST values. In addition, there exist situations where it is desirable to distinguish the template arguments from the fully constructed template instance, such as in situations where the template arguments can be used in other templates.

Various ways of providing arguments for templates exhibit various disadvantages. The use of URLs to provide template arguments, for example, is affected by limitations regarding browser capabilities. Many browser applications have limits on the size of URLs, thereby creating size limitations for arguments appended to URLs. If the arguments for a template have a collective size exceeding that which is allowed by a browser, providing the arguments can become a complex endeavor. In addition, the use of URLs for providing template arguments can adversely impact user experience. In some instances, for example, users may want to provide URLs to other users. One way of doing this is to cut and paste a URL into a document, such as an electronic mail message, that can be transferred to another user. A URL with multiple appended parameters may be unsightly and may occupy a substantial amount of space in a document. In addition to all of this, the various conventional ways of providing arguments for templates often require servers to combine template arguments with templates, thereby requiring the servers to utilize their own resources for template construction and, therefore, significantly decreasing the servers' ability to respond to other requests. These and other disadvantages may be overcome by various embodiments of the present disclosure.

DETAILED DESCRIPTION

Figure 1:
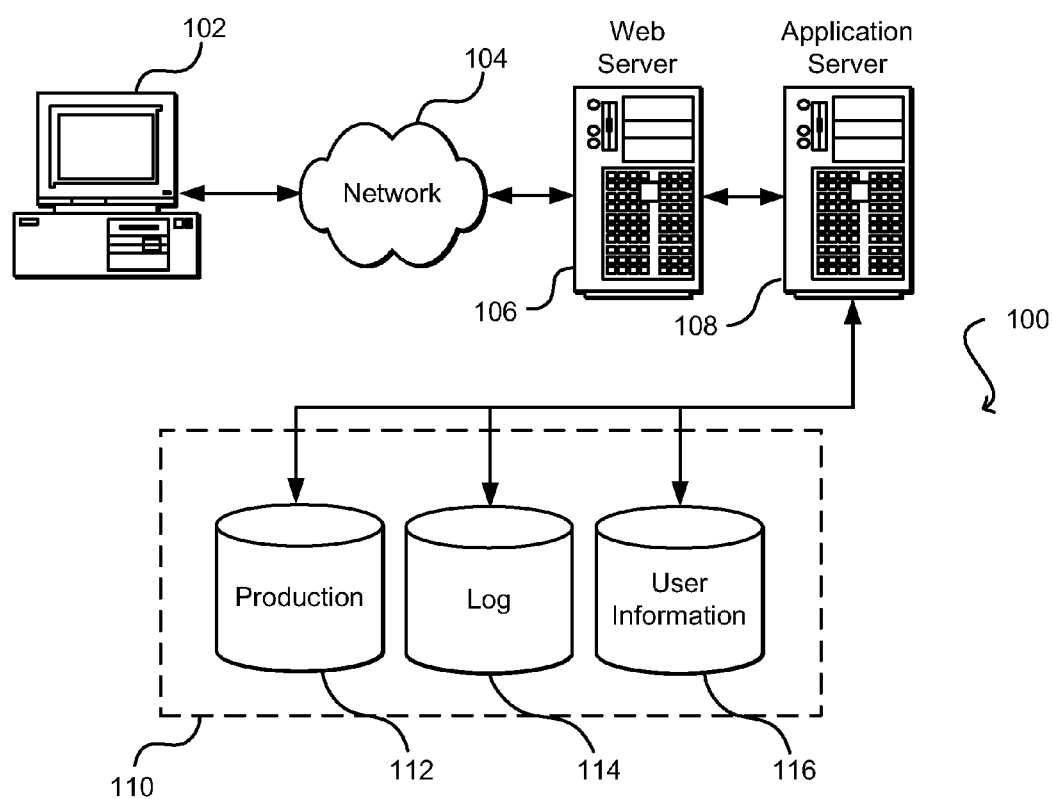
FIG. 1 illustrates an environment in which various embodiments can be implemented.

Techniques described and suggested herein include systems and methods for providing content to users, as well as approaches to arranging, selecting, and/or displaying that content. In an embodiment, at least one template and one or more arguments for the template are provided to a client device or other appropriate system or component. The template and one or more arguments may be provided, for example, as part of a process of providing content to a browser to enable the browser to display a web page. The browser may request a web page at a URL, where the URL contains a link to the template and one or more links to arguments for the template. The template may be used to construct a display of the whole web page or for a portion of the web page, such as an advertisement or other content to be displayed or otherwise provided concurrently with content of the web page. While the present disclosure utilizes web pages for the purpose of illustration, templates and arguments for the templates for any appropriate type of electronic interface may be provided in accordance with the various embodiments described herein for other types of content and, generally, any type of content that is constructible using templates.

In an embodiment, the template and arguments for the template are provided to a computing device (e.g., a client) in a manner that enables device to combine the template with at least some of the one or more arguments. In this manner, devices that provide the templates and arguments for the templates do not need to use some of their own resources, such as processing capacity, for the purpose of combining templates and arguments. In addition, the template and arguments for the template, in an embodiment, are provided in a cacheable manner to enable a browser, an edge cache or other server, and/or other device to cache the template and/or arguments for efficient future access. For example, a template may be encoded in a JavaScript file or other type of file that is provided to the client. Similarly, arguments for the template may be encoded in a JavaScript or other type of file that is provided to the client. In an embodiment, arguments for the template include information organized according to a plaintext format, such as according to JavaScript Object Notation (JSON), extensible markup language (XML), and/or comma-separated values (CSV). A file containing arguments for the template may not include any specifications for how the information should be displayed. Likewise, the template may not include any information that, when combined with one or more arguments by the client, is displayed. Further, the template may include information that, when combined with one or more arguments by the client, determine the manner in which the argument data is displayed.

Files containing templates and/or templates containing arguments for the template may be redundantly stored in various geographic locations to enable more efficient distribution of templates and arguments for the templates. As an example, a file containing a template may be stored in one or more edge caches of a content delivery network (CDN).

When client devices dispatch requests for content that makes use of templates, if the client devices do not have an appropriate template and/or set of one or more arguments for the template already cached, the template and/or set of one or more arguments for the template may be provided to the clients from an appropriate geographical location, such as from an edge cache that is closer than other edge caches. Templates and/or arguments for the templates may be provided to the various geographical locations in different ways. For example, developers who develop templates and/or arguments for the templates may, upon development, send or cause to be sent the developed templates and/or arguments to multiple geographical locations. Templates and/or arguments for the templates may also be stored in one or more central locations until requested from another location, such as by an edge server of a content delivery network.

The manner by which templates and/or arguments for the templates are provided, in various embodiments, provides other advantages for at least content providers in addition to efficiency savings resulting in client combination of templates with arguments. For instance, a single template may be used with multiple sets of arguments to create multiple instances of completed templates that are different from one another. Accordingly, if a client has a template cached, when the client requests content that makes use of the template, a server providing the content may not need to send the template to the client an additional time, even if the client does not have corresponding arguments for the template cached. Further, a single template may even be used multiple times in order to present a single web page or other instance of content. Therefore, a server that provides the template may have to send to the client the template a fewer number of times than the number of times the template is used by the client.

Similarly, because, in an embodiment, templates and arguments for the template are sent to a client as separate units of content, if the client has a set of arguments for a template cached, when the client requests content that makes use of the arguments, a server providing the content may not need to send arguments for the template to the client an additional time, even if the client does not have a corresponding template cached. Thus, client-side storage of templates and/or arguments for the templates is able to reduce the amount of bandwidth used for providing template-related content and the number of requests and responses between clients and servers. Other features, variations, and advantages to the present disclosure are described below.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing log data 114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 110. The data store 110 is operable, through logic associated therewith, to receive instructions from the application server 108 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIPS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Figure 2:
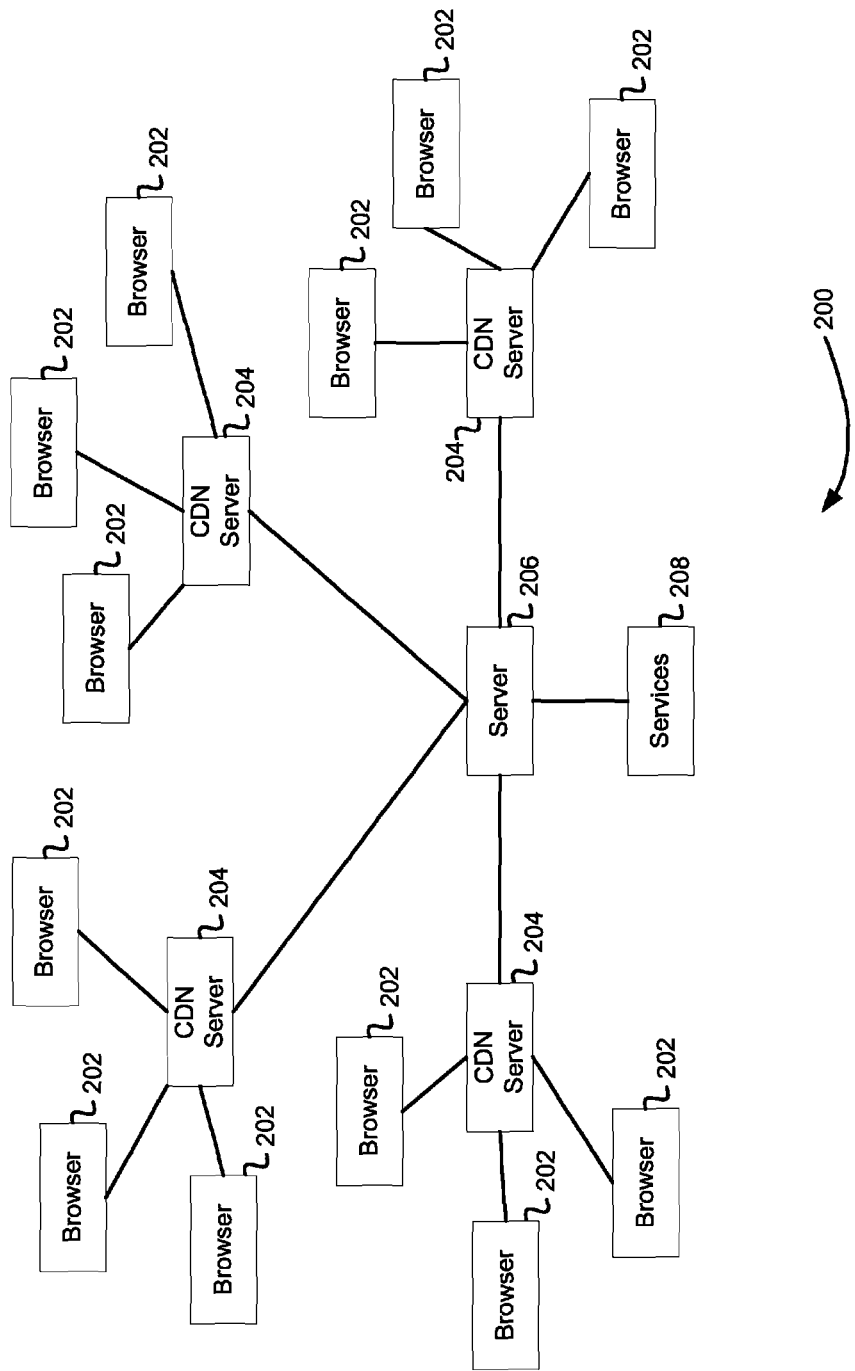
FIG. 2 illustrates another environment in which various embodiments can be implemented, and which may be used in connection with the environment shown in FIG. 1.

FIG. 2 illustrates a sample environment 200 in which embodiments of the present disclosure may be practiced. Components and configurations described above in connection with FIG. 1 may be utilized in connection with FIG. 2, although other configurations and components may also be used. In an embodiment, the environment 200 includes a plurality of browsers 202. The browsers may be applications for viewing content that execute on devices of users or on devices operated on behalf of users. The devices may be notebook computers, desktop computers, mobile devices, electronic book readers, tablet computing devices or, generally, any device that is operable to retrieve and present content. Also, the browsers 202 may be any application configured to retrieve and present content, including, but not limited to, browsers that are operable to retrieve, present, and provide navigation among web pages and other content.

In an embodiment, the browsers 202 retrieve content and cause the content to be presented to users of the browsers 202, such as on display screens on devices of the users. As an example, a user may type an identifier of content (such as a Uniform Resource Locator) into an interface of the browser and the browser may retrieve and cause display of the content corresponding to the identifier. Similarly, a user may select a hyperlink displayed by the browser or another application and such selection may cause the browser to retrieve and cause the display of content corresponding to the hyperlink. The browsers may also automatically retrieve and present content, such as when the browser is processing a script of already-loaded content or during modification of a content presentation, such as pursuant to asynchronous JavaScript and XML techniques.

In an embodiment, the browsers 202 are configured to retrieve content from various servers. For example, as shown in FIG. 2, the browsers are configured to retrieve content from one or more content delivery network (CDN) servers. A CDN server is a server that has (or at least has access to) a copy of a data set, at least a portion of which is stored in connection with another server. CDN servers may include data storage devices, which may be referred to as edge caches, and may also be referred to as edge servers. A CDN server may store copies of web page content that is stored in other CDN servers in order to allow distribution of the content from multiple devices.

A browser 202 may retrieve content from a CDN server in various ways. For example, a browser may send a request for content that specifies a particular URL that is usable to locate the requested content. The request may be received by a domain name service (DNS) server (not shown), which is a server that receives the request and responds with an identifier (such as an Internet Protocol (IP) address) of an appropriate server for retrieving the content. The DNS server may, for instance, provide the browser an identifier of the closest CDN server that it can provide the content corresponding to the URL. A DNS server may also provide identifiers of other servers, not necessarily CDN servers. In this manner, content can be distributed from multiple CDN servers using a single URL or other identifier. Thus, providers of content can provide content from multiple locations, thereby improving user experience by reducing latency and by spreading out user-generated loads over multiple systems.

In an embodiment, when a CDN server receives a request for content, the CDN server may first check whether it has the requested content and, if it does not, it may request the requested content from another server, such as a central server 206 that is operable to communicate with a plurality of CDN servers 204 in a network of CDN servers. When the CDN receives the content, the CDN server may forward the content to the user that requested the content. In addition, the CDN server may cache the content so as to be able to more quickly provide the same content when requested by the same or by other browsers. In addition to caching content upon retrieval, CDN servers may store content in other ways. For example, when content is developed, developers of the content may push content to a plurality of CDN servers to make such content immediately available. Pushing content to a CDN server may be through the server 206, by instructing the server 206 to send content to various IP addresses of the CDN servers for storage, or in other ways which may bypass the server 206.

The server 206, in an embodiment, is operable to provide content to each of the CDN servers. As noted, the server 206 may be configured to provide content to a CDN server responsive to a request by the CDN server, upon request of a user of the server 206, or in other ways. The server 206 may provide content to the CDN server from its own storage. The server 206 may also provide content (or, generally, information) in other ways. For example, the server 206 may have access to one or more services 208, which may be provided from one or more other computing devices separate from the server 206. A service may be any application operable to provide information to the server 206. The server 206, for instance, may request information from one of the services 208 and receive a response from the service. As a concrete example, as noted above, templates are often used to provide content to users. The server 206, for example, may request information from one of the services 208 in order to combine the information with the template to provide content to a user, perhaps through one of the CDN servers 204. As another example, the server 206 may be operable to provide web pages. When a web page is requested from the server 206, the server may request one or more advertisements from one or more of the services 208 in order to provide advertisements with the web page that the server provides. Services can be used for other purposes as well, such as authentication, account management, computation, and, generally, any purpose. The services 208 may include any service that is usable in a system for providing content to users.

The environment 200 provided in FIG. 2 is simplified for the purpose of illustration. Variations of the environment 200 are considered as being within the scope of the present disclosure. For example, FIG. 2 shows various numbers of different components. However, various embodiments may include more or fewer components than shown in FIG. 2. Further FIG. 2 shows various components in a specific configuration. Other configurations are also considered as being within the scope of the present disclosure. For instance, a browser may access more than one CDN server and/or may access the server without requests passing through a CDN server. Further, components other than those illustrated in the figure may be included in various embodiments and other embodiments may not have every illustrated component. Generally, the environment 200 illustrates components of a network which may be part of a larger network, such as the Internet.

Figure 3:
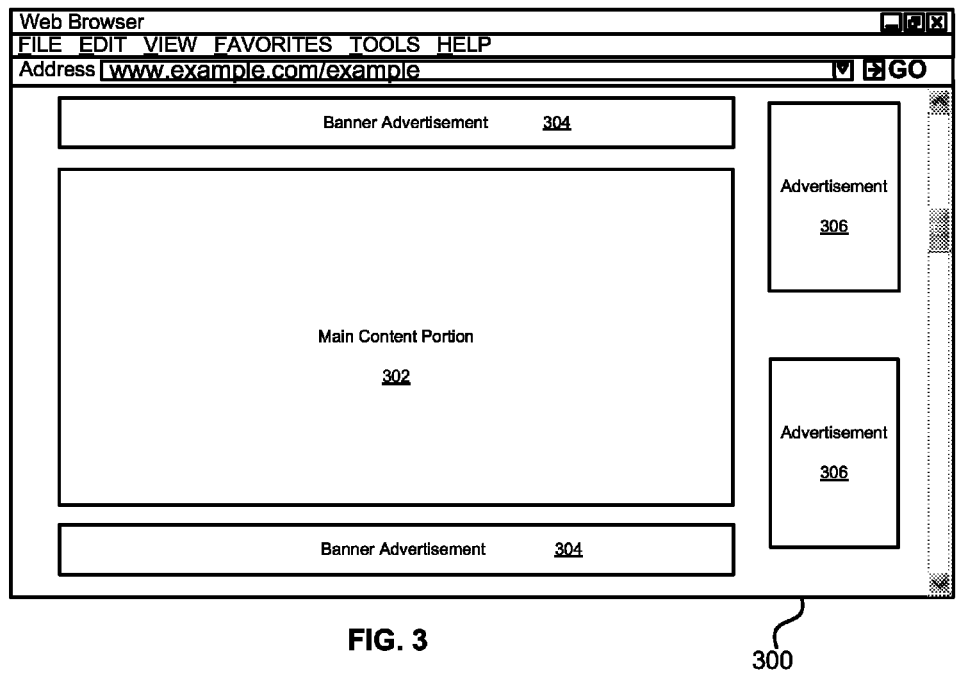
FIG. 3 is an illustrative example of a browser interface displaying content that may be provided for display by the browser interface, in accordance with an embodiment.

FIG. 3 shows an illustrative example of an interface page that demonstrates content that may be provided to a user utilizing the environment 200, discussed above. In this particular example, the content is shown as displayed by a browser interface 300. While FIG. 3 shows a particular browser interface 300 for the purpose of illustration, other browser interfaces may be used. For example, the browser interface 300 may take the form of any application operable to display content. The browser interface 300 may be, for instance, an interface used primarily in connection with an electronic content marketplace that is used to enable users to consume electronic content, such as music, games, videos, electronic books, and other electronic content. In the illustrated example, the browser interface is a graphical user interface (GUI). While included in the illustrated example, a browser interface need not have graphical navigation controls, but may provide the ability to manipulate and navigate content in other ways, such as through a touch-screen interface that does not necessarily utilize visible navigational components.

As shown in the illustrative example of FIG. 3, the browser interface 300 includes a main content portion 302. The main content portion 302, in an embodiment, may include text, video, audio, animations, and/or other content. The main content portion 302 may, for instance, provide information about a certain topic, such as a particular film. Generally, the main content portion 302 may include any content. Further, while the main content portion is shown as a rectangular area that occupies a central portion of the display of the browser interface 300 for the purpose of illustration, other configurations are possible. Generally, content may take any suitable form and may be positioned in any area or collection of areas of a display.

In an embodiment, the browser interface 300 is shown as displaying a plurality of different advertisements. For example, the browser interface 300 as shown includes a plurality of banner advertisements 304, which may be advertisements configured to be displayed with content in a horizontally-oriented rectangle, such as in a manner displayed in the figure. Similarly, the illustrated browser interface 300 displays a plurality of other advertisements 306 on the right hand side of the main content portion 302. As with other portions of the examples illustrated herein, variations of that which is shown are considered within the scope of the present disclosure. For example, the banner advertisements 304 and other advertisements 306 are shown as rectangles in particular positions on a web page for the purpose of illustrations, but any advertisement may have another form and/or position. Advertisements may, for example, be superimposed on other content and may include an interface element that allows users to close (cause to disappear or shrink) an advertisement or to move an advertisement to another part of the display.

Some or all of the various components of the display illustrated in FIG. 3 may be composed using templates. For instance, a template may be used to construct the main content portion 302, the banner advertisements 304, and the other advertisements 306. A template may also be used to generate the entire display. Different templates may be used for each portion of the illustrated display. Also, the same template may be used multiple times to generate the same display. Each of the banner advertisements 304 may, for instance, appear different from one another, but be constructed from the same template. The different presentation of each banner advertisement may be accomplished by using different arguments for each of the banner advertisements 304. Similarly, each of the other advertisements 306 may appear different from one another, yet be constructed using the same template but with different sets of arguments for the templates.

In the specific context of a web page, to construct the display illustrated in FIG. 3, the browser may request the content by specifying a URL for the web page, such as the URL illustrated in the figure. Content returned in response to the request may include one or more links to templates and one or more links to arguments for the template(s). As a specific example, hypertext markup language (HTML) code may, for one of the advertisements 306, include code such as <script src="example<dot>com/mytemplate<dot>js>" for the template and <script src="example<dot>com/mydataobject<dot>js>" for a file containing one or more arguments for the template, where <dot> is replaced by the character of that name. The HTML code may include a URL that encodes links to both a template file and an argument file. In addition or as an alternative, the HTML code may include a reference to the argument file and the argument file may specify a particular template file to be used for combination with information in the argument file. For instance, the argument file may include a hyperlink or other reference to a particular template file or even a version of a particular template file. While the HTML, URLs, and other technologies and techniques are used for the purpose of illustration, the scope of the present disclosure is not limited to the specific technologies and examples of such technologies provided herein.

Figure 4:
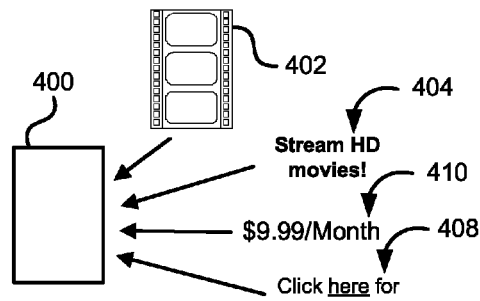
FIG. 4 provides an illustrative example of content that may be generated using a template and illustrates how arguments for the template may be combined with the template, in accordance with an embodiment.
Figure 4:
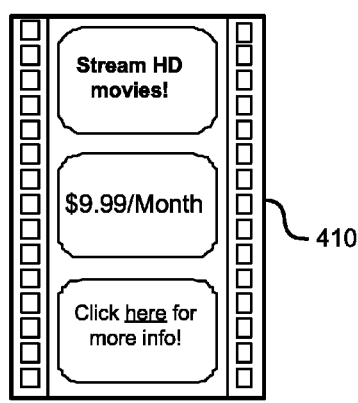

FIG. 4 shows a representation of an illustrative example of a process generating content for display, in accordance with an embodiment. In this particular example, FIG. 4 shows how an advertisement, such as one of the advertisements 306 described above in connection with FIG. 3, may be generated. In an embodiment, a template 400 is combined with various data for the template 400. A template may be a schema for combining information. For example, a template may determine a manner in which information is combined and may influence one or more of the size, layout, organization, and other aspects of the combined information. The template may contain executable instructions and/or parameters for combining information with the template, although such information may be provided separately from the template, such as in HTML or other content. Generally, the instructions and/or parameters may be provided in any suitable manner, such as in any suitable manner that is part of an automatic process for communicating with a client to enable the client to display content. For example, the template may be a JavaScript file with JavaScript code that may be executed by a browser or other application to cause the browser or other application to combine the template with other information. The template, however, may be any schema in any suitable format. For example, as illustrated in FIG. 4, the template 400 is combined with a background image 402. The template may define that the background image should occupy a certain area and that other information combined with the template should appear when the background image 402 and other information occupies the same area, thereby causing the other information to appear, when displayed, as if the other information is superimposed onto the background image.

In this particular instance, other information is combined with the template 400, such as a title 404. The template 400 may dictate the placement of the title when combined with the template. Other information includes a content element 404 and an additional content element 406. As shown in FIG. 4, the background image 402, title 404, content element 404, and additional content element 408 are combined according to the template 400 in order to form a completed template 410 in which each of the background image 402, title 404, content element 404, and additional content element 408 are concurrently displayed.

In the example provided in FIG. 4, information for the template 400 includes an image and various instances of text. Other types of information may be combined with a template in addition to or as an alternative to images and text. For example, information for a template may comprise animations, audio, parameters for display of other information and/or, generally, any type of information that may be presented to a user and/or that may be used to affect how information is presented to a user. In addition, while FIG. 4 shows a certain arrangement of various types of information, variations are considered as being within the scope of the present disclosure. There may be, for instance, more or fewer items of information than illustrated.

Figure 5:
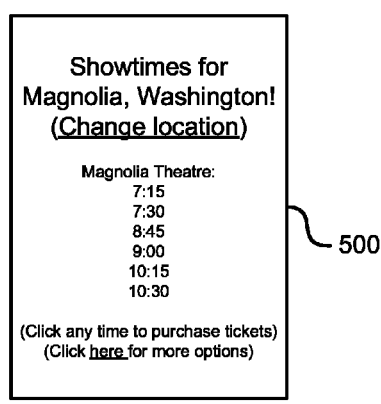
FIG. 5 provides an illustrative example of other content that may be generated using a template, in accordance with an embodiment.

While templates are useful for advertisements, templates are also useful for other types of content. FIG. 5, for example, shows another example of an item of content that may be generated using a template, such as a template having characteristics similar to those of the template 400 discussed above in connection with FIG. 4. In this example, FIG. 5 shows a display 500 of a content application which, for the purpose of illustration, is dedicated to movie show times. The display 500 may be provided to users with content, such as in a location of one of the advertisements 406 described above in connection with FIG. 4, or in any suitable location. The display 500 may be provided to a user, for example, visiting a web page dedicated to a particular movie, movies in general, or related subjects.

In an embodiment, a template (not shown) may be combined with information provided dynamically. As an example, various information about a user may be known or ascertainable, such as a geographical location in which the user is located. A mapping IP addresses to locations may be used to determine, based on the user's IP address, the user's location. Global positioning service (GPS) data or other techniques may also be used. When the user requests a web page onto which a display of the content application is to be presented, a server may use location information about the user to obtain information about movie show times at one or more movie theatres near the user. A server may, for instance, utilize a service, such as one of the services 208 described above in connection with FIG. 2. The server may call a service using an application programming interface (API) of the service, providing the service information identifying the user's location. The service may then reference the location in a data store, such as a database table, and return information about movie times in the user's location. This information, possibly with other information, may be combined with a template to create the display 500 in FIG. 5. As discussed above, in conventional techniques, the server or another server may combine the information and the template and provide the completed template to a device of the user for display. In an embodiment, as described in more detail below, the template and the information are sent to a device of the user and the user's device combines the information and the template.

Figure 6:
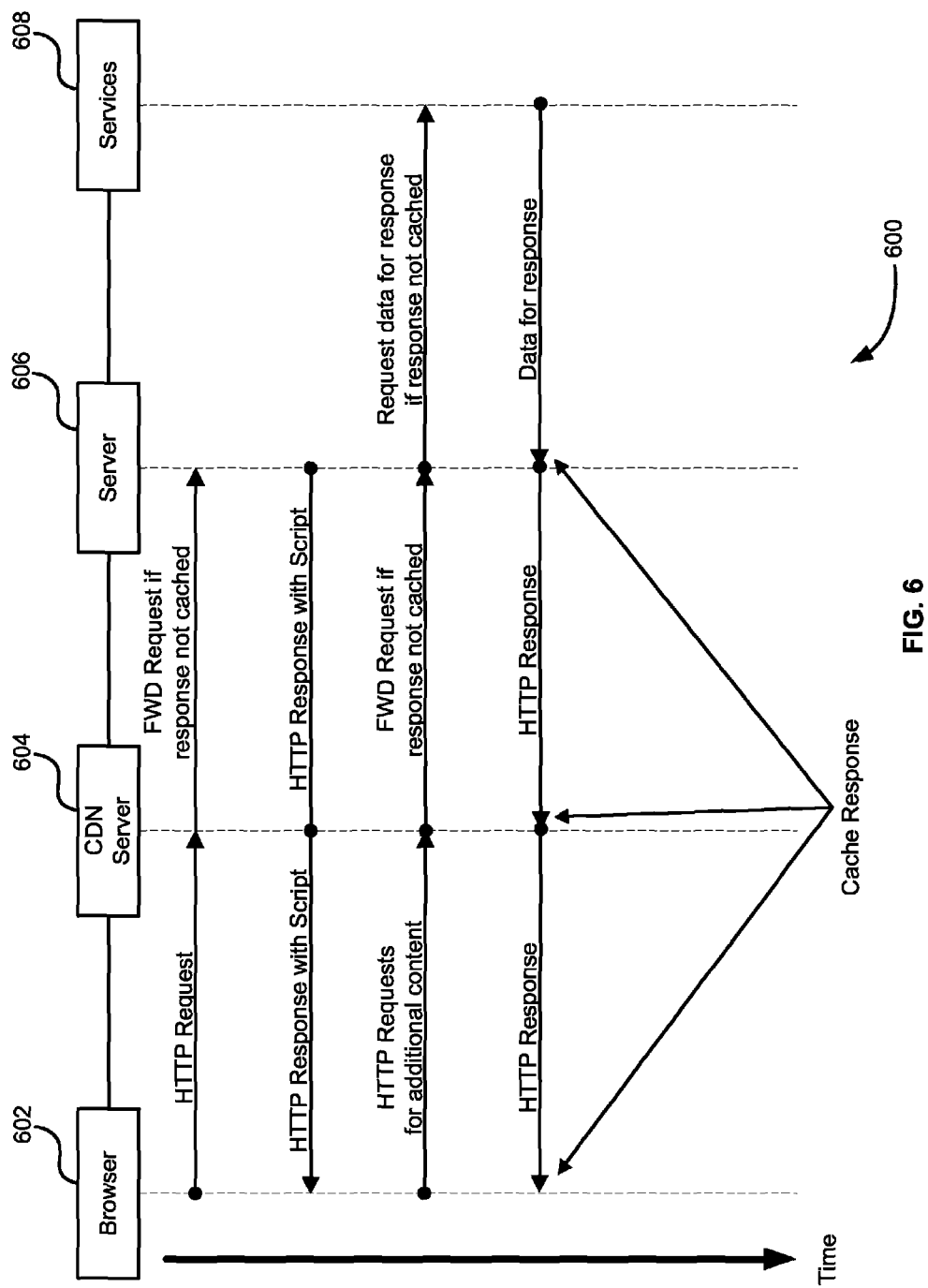
FIG. 6 illustrates a flow of information in an automatic process of providing content to a browser, in accordance with an embodiment.

FIG. 6 shows a diagram 600 that illustrates how a browser 602, CDN server 604, server 606, and one or more services 608 may interact with one another in order to provide content to a user of the browser 602. As above, the diagram 600 is simplified for the purpose of illustration and various embodiments may include more or fewer and/or different components than illustrated. In this example, the browser 602 sends a hypertext transfer protocol (HTTP) request for content to the CDN server 604. The request may be sent in response to user navigation to a web page, for example. If, in an embodiment, the CDN server 604 does not have content responsive to the request, the CDN server may forward the request to the server 606. Alternatively, the HTTP request may be sent to the server 606, bypassing the CDN server 604. If the CDN server has content responsive to the request, the CDN server provides an HTTP response to the browser 602, in an embodiment. Likewise, if the server 606 received the HTTP request, the server 606 may provide an HTTP response to the browser 602, in an embodiment. In an embodiment, the HTTP response includes script, such as JavaScript, or other instructions to the browser that cause the browser to request additional content, as described below. The HTTP response may, for example, utilize asynchronous JavaScript and XML (AJAX) techniques. Generally, a response from the server 606 or CDN server may utilize any technique for enabling the browser 602 to receive additional information.

In an embodiment, when the browser 602 receives the HTTP response, the browser 602 executes the script of the HTTP response and accordingly sends one or more HTTP requests for additional content. The additional content, in an embodiment, includes a template and/or data for combining with the template. The browser 602 may, for instance, check a local cache for the template and/or data and, if the template and/or data is not in the local cache, make one or more HTTP requests for any of the template and/or data that is not in the local cache. The browser may send separate requests for both a template and data for combining with the template or may request both the template and data for combining with the template in a single response.

In an embodiment, the CDN server 604 receives the HTTP request from the browser 602 and checks its own cache for the requested additional content. If the CDN server 604 does not have some or all of the additional requested content, the CDN server 604 may forward the request for additional content to the server 606 (or otherwise request the additional content not in the cache of the CDN server 604). Similarly, if the server 606 receives a request for additional content, the server 606 may check its own cache for some or all of the requested additional content and, if all or some of the requested additional content is not in the cache of the server 606, the server 606 may request the data not in the server's cache from one or more services 608. For example, if the server 606 does not have a requested template in its cache, the server 606 may request a template from a template service. The request for the template may include information identifying a particular template needed to be selected from a plurality of templates. The request for the template may include information identifying a particular template needed to be selected form a plurality of templates. Similarly, if the server 606 does not have requested data for combining with a template in its cache, the server 606 may request such data from a data service that is operable to provide such data. The request for data from the data service may include information from which a proper data set may be selected, collected, and/or generated by the data service.

In an embodiment, if the CDN server 604 has additional content responsive to the request(s) of the browser 602 for additional content, the CDN server 604 provides the additional content in one or more HTTP responses. Similarly, if the server 606 has additional content responsive to the request(s) of the browser 602 for additional content or if the server has obtained additional content responsive to the request of the browser 602, the server 606 provides the additional content in one or more HTTP responses.

As noted in the diagram 600, at any point when the browser 602, CDN server 604, and/or server 606 receives additional content, the browser 602, CDN server 604, and/or server 606 may cache the additional content. In this manner, if the browser, for example, needs the template and/or the data for combining with the template at a later time, the browser may obtain the template and/or data for combining with the template from its own cache instead of having to request the template and/or data for combining with the template from another device and waiting for a response. Similarly, if the CDN server 604, for example, needs the template and/or the data for combining with the template at a later time, such as to respond to another browser's request, the CDN server may obtain the template and/or data for combining with the template from its own cache instead of having to request the template and/or data for combining with the template from another device and waiting for a response. Also, if the server 606 needs the template and/or the data for combining with the template at a later time, such as in a response from another CDN server or perhaps from another browser, the server may obtain the template and/or data for combining with the template from its own cache instead of having to request the template and/or data for combining with the template from another device and waiting for a response.

In an embodiment, when the browser 602 receives the requested additional content, the browser 602 combines the template with the data for the template in order to provide the completed content and provide the completed content to the user, such as by displaying the completed content on a display device of the user. In this manner, the CDN server 604 and server 606 do not need to use resources to combine templates with data, thereby providing an increased capability to respond to various requests and perform other operations compared to the capabilities when using traditional techniques.

The embodiment illustrated in FIG. 6, and other embodiments described herein and variations thereof, provide other advantages. For instance, as the browser 602 navigates through various instances of content (web pages, e.g.), any templates and/or data for templates may be reused by the browser. The same template, for example, may be used to provide numerous advertisements to the user, without having to send a separate completed template to the browser for each advertisement. Similarly, the same data may be used for multiple templates, such as to provide the same advertisement to a user in various different ways, thereby potentially increasing the user's interest in the advertisement. It should be noted that a template may not use all data that is sent for combination with the template, but it may.

Figure 7:
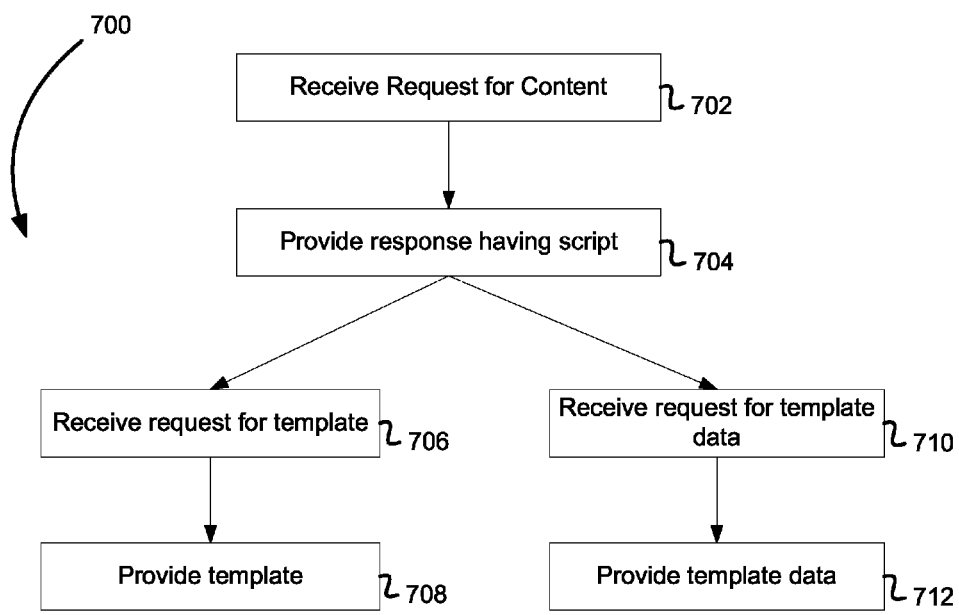
FIG. 7 is a flowchart of an illustrative example of a process for providing content, in accordance with an embodiment.

FIG. 7 shows an illustrative example of a process 700 that may be used to provide content to a user, in accordance with an embodiment. The process 700 may utilize a flow of information similar to that presented above in connection with FIG. 6, although variations are contemplated as being within the scope of the present disclosure. Portions of the process 700 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors.

In an embodiment, a request for content is received 702. The request for content may be sent by a browser or other application and may have been sent in response to user input in connection with navigation among a set of documents, such as web pages. Once the request for content is received, a response is provided 704. The response may include script, such as JavaScript code, which enables the requestor to request additional content. A browser that receives the response, for instance, may be configured to execute instructions encoded in the response's script. The script, when executed by the browser, may cause the browser to request a template, request data for a template, and/or request other additional content.

For example, in an embodiment, when the response with script has been provided 704, a request for a template may be received 706. The request may have been sent responsive to execution of the script by the requestor. Responsive to the request for the template, the template is provided 708, in accordance with an embodiment. The template may be sent to a requesting browser, for instance. When the response with script has been provided 704, a request for a template data may be received 706. Template data may be any data that may be combined with the template for presentation to a user. As with the request for the template, the request for template data may have been sent responsive to execution of the script by the requestor. Responsive to the request for the template data, the template is provided 708, in accordance with an embodiment. Both the template and the data for the template may be packaged as files. The files may be, for instance, JavaScript files, although other ways of arranging information of the template and template data may be used. Providing the template and/or providing the template data may include sending the template and/or sending the template data to a device that is operable to combine the template with at least a portion of the template data, such as a device that operates a browser, as described above. The device may then combine the template and at least a portion of the template data.

Variations of the process 700 are contemplated as being within the spirit of the present disclosure. As an example, for the purpose of illustration, the request for the template and the request for template data are (as well as other steps) shown as occurring concurrently, although the requests may be received in any order. In addition, as with other figures presented herein, FIG. 7 is provided in a simplified for the purpose of illustration and variations are considered as being within the scope of the present disclosure. For instance, various other actions may be taken in connection with performance of the process 700, such as actions described above and other actions. As a concrete example, upon receiving a request for a template, a cache may be checked and the template may be retrieved if necessary.

Figure 8:
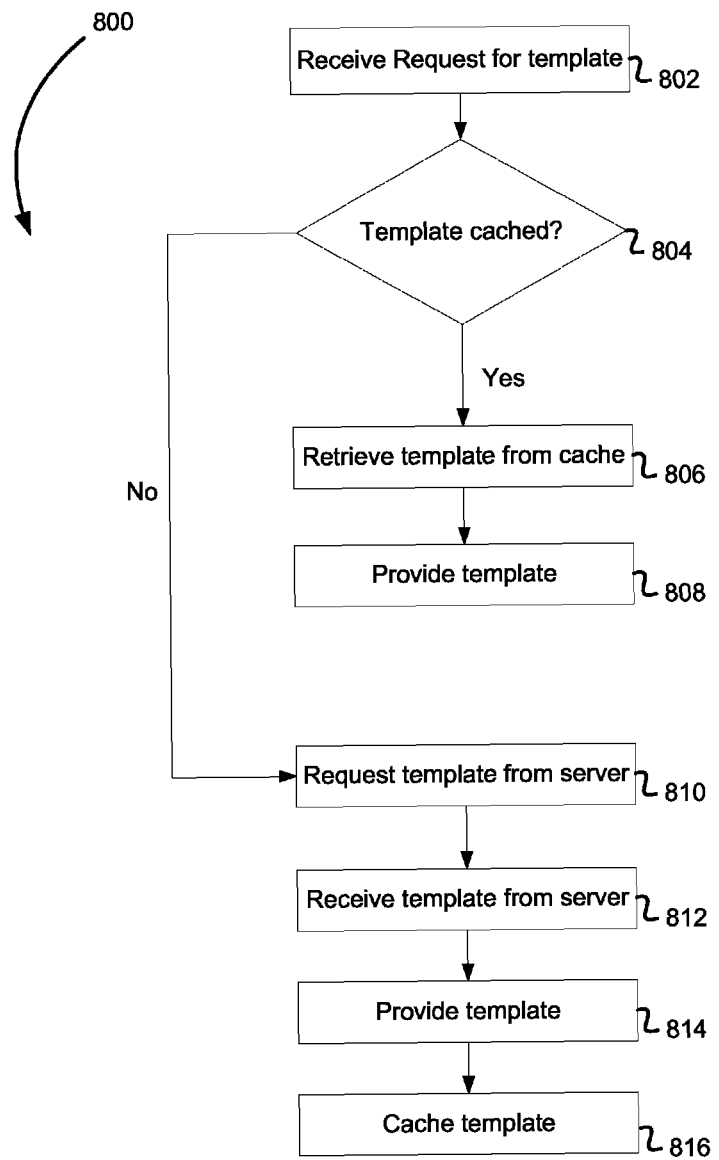
FIG. 8 is a flowchart of an illustrative example of a process for providing a template, in accordance with an embodiment.

FIG. 8, accordingly, shows a flowchart for an illustrative example of a process 800 for providing a template, in accordance with an embodiment. The process 800 may be used, for example, in connection with the process 700 described above in connection with FIG. 7. The process 800 may be performed by a browser and/or a server, such as any of the servers described above. In an embodiment, a request for a template is received 802. The request for the template may have been dispatched from a browser that did not locate the requested template in its own local cache. Alternatively, the request for the template may have been dispatched from a CDN or other server that did not locate the requested template in its own local cache. A server, such as the server 206 described above in connection with FIG. 2, may have dispatched the request to the server of a template service operable to receive requests for templates and provide the requested templates.

In an embodiment, responsive to receipt of the request for the template, a determination is made 804 whether the template is stored in a cache. A device that received the request for the template may, for instance, check its own data store (or another data store used in connection with the device) to determine whether the template has been cached in the store. If it is determined that the template has, in fact, been cached, the template is received from the cache 806, in accordance with an embodiment. Once the template has been retrieved from the cache, in an embodiment, the template may be provided 808 to the device that requested the template. For instance, a JavaScript or other file containing the template may be sent across a communications network to the requesting device.

If, however, it is determined 804 that the template is not cached, in an embodiment, the template is requested 810 from a server. For instance, if the process 800 is being performed by a browser, the browser may request a template from a CDN or other server. Similarly, if the process 800 is being performed by a CDN server, the CDN server may request the template from another server to which the CDN makes such requests when needed information is not cached. If the process 800 is being performed by a server, such as the server 206 described above in connection with FIG. 2, the server may request the template from a server that provides a template service, where the template service may operate using a server that is able to retrieve and provide templates upon request. Generally, the template may be requested 810 in any suitable manner.

When the server that received the request 810 for the template receives the request, the server may responsively provide the template. Accordingly, in an embodiment, the template is received 812 from the device that provided it and the template is provided 814 to the device that sent the request for the template that was received 802. In addition, in an embodiment, upon receiving 812 the template from the server, a device that received the template from the server may cache 816 the template in a local or other cache, thereby making the template more readily accessible for future requests. While shown in FIG. 8 as an action performed subsequent to providing 814 the template, caching 816 the template, if performed, may be performed before providing 814 the template or concurrently therewith.

Figure 9:
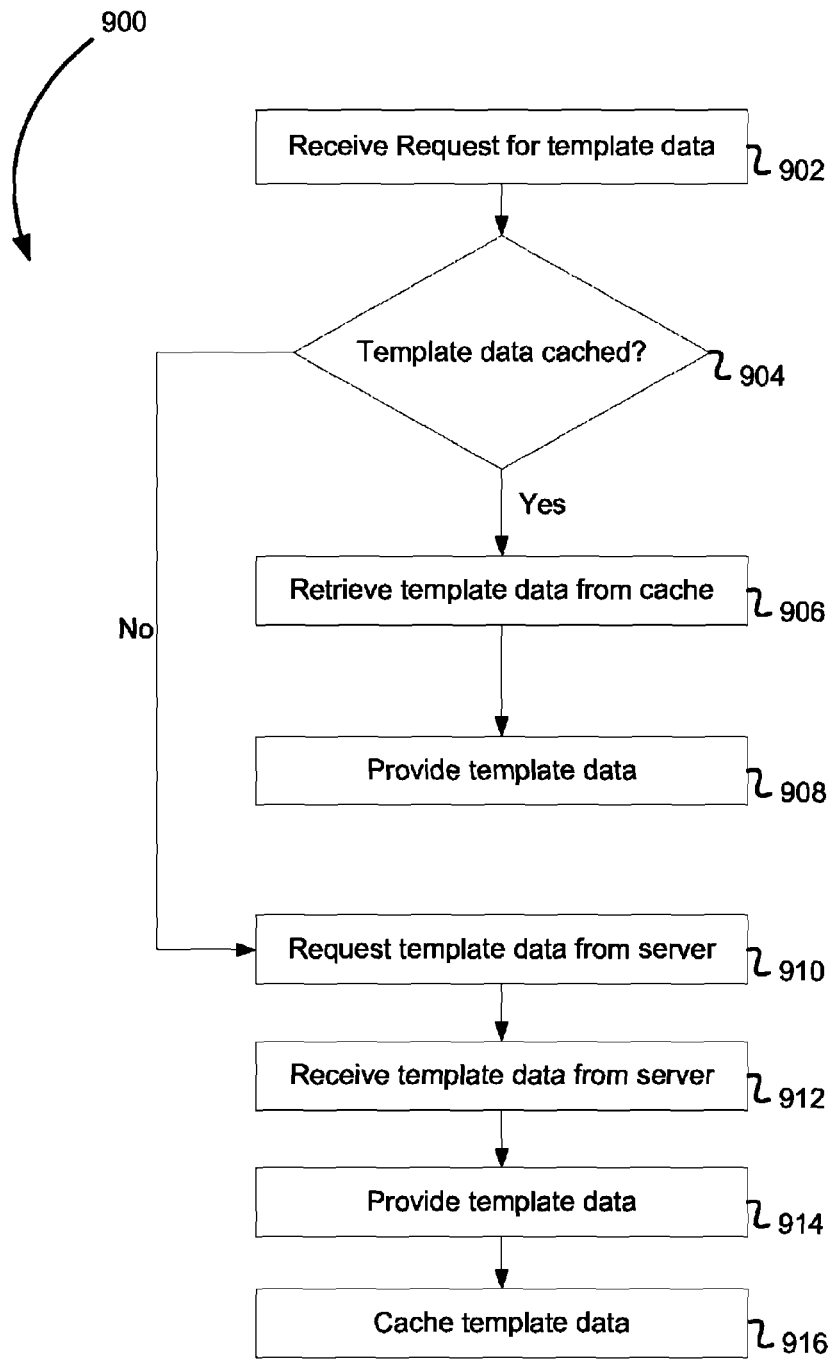
FIG. 9 is a flowchart of an illustrative example of a process for providing arguments for a template, in accordance with an embodiment.

FIG. 9 shows a flowchart for an illustrative example of a process 900 for providing a template data, in accordance with an embodiment. The process 900, in several aspects, is similar to the process 800, described above in connection with FIG. 8. The process 900 shown in FIG. 9, for instance, may be used in connection with the process 700 described above in connection with FIG. 7 in order to provide template data. The process 900 may be performed by a browser and/or by a server, such as any of the servers described above. In an embodiment, a request for template data is received 902. The request for the template data may have been dispatched from a browser that did not locate the requested template data in its own local cache. Alternatively, the request for the template may have been dispatched from a CDN or other server that did not locate the requested template in its own local cache. A server, such as the server 206 described above in connection with FIG. 2, may have dispatched the request to the server of a template data service operable to receive requests for template data and provide the requested template data.

In an embodiment, responsive to receipt of the request for template data, a determination is made 904 whether the template data is stored in a cache. A device that received the request for the template data may, for instance, check its own data store (or another data store used in connection with the device) to determine whether one or more files containing the template data have been cached in the store. If it is determined that the template data have, in fact, been cached, the template data are received from the cache 906, in accordance with an embodiment. Once the template data have been retrieved from the cache, in an embodiment, the template data may be provided 908 to the device that requested the template. For instance, a JavaScript or other file containing the template data may be sent across a communications network to the requesting device.

If, however, it is determined 904 that the template data are not cached, in an embodiment, the template data are requested 910 from a server. For instance, if the process 900 is being performed by a browser, the browser may request a template from a CDN or other server. Similarly, if the process 900 is being performed by a CDN server, the CDN server may request the template from another server to which the CDN makes such requests when needed information is not cached. If the process 900 is being performed by a server, such as the server 206 described above in connection with FIG. 2, the server may request the template data from a server that provides a template data service, where the template data service may operate using a server that is able to retrieve and provide template data upon request. Generally, the template data may be requested 910 in any suitable manner.

When the server that received the request 910 for the template data receives the request, the server may responsively provide the template. Accordingly, in an embodiment, the template data are received 912 from the device that provided it and the template data are provided 814 to the device that sent the request for the template data that was received 902. In addition, in an embodiment, upon receiving 912 the template data from the server, a device that received the template from the server may cache 916 the template data in a local or other cache, thereby making the template data more readily accessible for future requests. While shown in FIG. 9 as an action performed subsequent to providing 914 the template, caching 916 the template, if performed, may be performed before providing 914 the template or concurrently therewith.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for providing content, comprising:
under the control of an edge server system comprising an edge server data store and one or more computer systems that are collectively operable to access the edge server data store and that are being configured with executable instructions,
receiving, from a requestor, a request for content;
in response to the request for content, providing to the requestor information identifying an associated template and an associated data set, the associated data set organized according to a plaintext format and the associated template specifying a manner of displaying at least a portion of a data set;
receiving, from the requestor, at least one subsequent request for the associated template and the associated data set;
providing the associated template to the requestor, the template being retrieved from the edge server data store when the template is available from the edge data store and being retrieved from a second data store that is remote to the edge server data store when the template is not available from the edge data store;
providing data from the associated data set to the requestor, the data being retrieved from the edge server data store when the associated data set is available from the edge data store and being retrieved from a second data store that is remote to the edge server data store when the associated data set is not available from the edge data store,
wherein the requestor is able to view the requested content and data from the data set according to the associated template.

2. The computer-implemented method of claim 1, wherein receiving at least one subsequent request for the associated template and the associated data set includes receiving separate requests for the associated template and the associated data set.

3. The computer-implemented method of claim 1, further comprising:
when determined that the associated template is unavailable from the edge server data store, storing the associated template in the edge server data store; and
when determined that the associated data set is unavailable from the edge server data store, storing the associated data set in the edge server data store.

4. The computer-implemented method of claim 1, wherein providing the associated template to the requestor and providing the associated data set to the requestor are performed in a manner that allows the requestor to separately cache the associated template and the associated data set.

5. The computer-implemented method of claim 1, further comprising:
receiving a second request for second content;
in response to the request for second content, providing second information specifying the associated template and a second data set for the associated template and including instructions for combining the associated template and the second data set; and
providing, from the edge server data store, the second data set.

6. The computer-implemented method of claim 1, wherein requested content is a web page and wherein the associated template is for a portion of content to be displayed concurrently with the web page.

7. A computer-implemented method of providing content, comprising:
under the control of one or more computer systems configured with executable instructions,
storing each of one or more argument files in a plurality of data stores that are geographically remote from one another, the plurality of data stores including at least one edge server data store, each of the plurality of data stores accessible by a corresponding server of a plurality of servers, each of the servers associated with a common network address, and each of the one or more argument files including information organized according to a plaintext format;
storing each of one or more template files in the plurality of data stores, each of the one or more template files specifying a manner of displaying the information organized according to the plaintext format;
receiving a content request that was dispatched by the client device to the common network address; and
providing one or more associated template files, of the one or more template files, and one or more particular augment files for the request, the one or more associated template files being retrieved from the edge server data store when the one or more associated template files is available from the edge data store and being retrieved from a second data store that is remote to the edge server data store when the one or more associated template files is not available from the edge data store, the one or more associated template files and one or more particular argument files being provided to the client device for combination, by the client device, to enable the client device to display information of the one or more particular argument files based at least in part on the one or more associated template files.

8. The computer-implemented method of claim 7, wherein providing the one or more associated template files and one or more argument files includes providing instructions for combining a number of the one or more associated template files with a higher number of the one or more particular argument files.

9. The computer-implemented method of claim 7, wherein providing the one or more associated template files and one or more argument files includes providing instructions for combining a number of the one or more particular argument files with a higher number of the one or more associated template files.

10. The computer-implemented method of claim 7, wherein the one or more argument files and the one or more associated template files each include information encoded using a scripting language.

11. The computer-implemented method of claim 7, wherein the particular server is an edge server of a content delivery network.

12. A system for providing content accessible using a network address for the content, the system comprising at least:
an edge server data store storing one or more template files;
a plurality of data stores that are geographically remote from one another, that redundantly store one or more argument files, and that redundantly store a copy of at least a portion of the one or more template files, the one or more argument files each including information organized according to a plaintext format and the one or more template files each specifying a manner of displaying the information organized according to the plaintext format;
a plurality of servers that each access at least one of the data stores, each server being configured to, as part of a process of providing the content to a client device in connection with a request, by the client device specifying the network address, at least:

provide one or more associated template files, of the one or more template files, and one or more particular augment files for the request, the one or more associated template files being retrieved from the edge server data store when the one or more associated template files is available from the edge data store and being retrieved from a second data store, of the plurality of data stores, that is remote to the edge server data store when the one or more associated template files is not available from the edge data store, the one or more associated template files and the one or more particular argument files being provided to the client device for combination, by the client device, enable the client device to display information of the one or more argument files based at least in part on the one or more associated template files.

13. The system of claim 12, wherein providing the one or more associated template files and one or more argument files includes providing instructions for combining a number of the one or more associated template files with a higher number of the one or more particular argument files.

14. The system of claim 12, wherein providing the one or more associated template files and one or more argument files includes providing instructions for combining a number of the one or more particular argument files with a higher number of the one or more associated template files.

15. The system of claim 12, wherein the one or more argument files and the one or more template files each include information encoded using a scripting language.

* * * * *